US009188102B2

(12) United States Patent
Krishnamurthy et al.

(10) Patent No.: US 9,188,102 B2
(45) Date of Patent: Nov. 17, 2015

(54) WIND TURBINE BLADES WITH TENSION FABRIC SKIN STRUCTURE

(71) Applicant: General Electric Company, Schenectady, NY (US)

(72) Inventors: Sriram Krishnamurthy, Bangalore (IN); Wendy Wen-Ling Lin, Niskayuna, NY (US); Suresh Subramanian, Bangalore (IN); Subbareddy Daggumati, Bangalore (IN); Udit Kulmi, Bangalore (IN); Prakash Kashiram Jadhav, Bangalore (IN); Vasan Churchill Srinivasan Chandrasekaran, Bangalore (IN)

(73) Assignee: General Electric Company, Niskayuna, NY (US)

( * ) Notice: Subject to any disclaimer, the term of this patent is extended or adjusted under 35 U.S.C. 154(b) by 495 days.

(21) Appl. No.: 13/665,148

(22) Filed: Oct. 31, 2012

(65) Prior Publication Data

US 2014/0119940 A1 May 1, 2014

(51) Int. Cl.
*F03D 11/00* (2006.01)
*F03D 1/06* (2006.01)

(52) U.S. Cl.
CPC ....... *F03D 1/0675* (2013.01); *F05B 2280/4003* (2013.01); *F05B 2280/5001* (2013.01); *F05B 2280/6002* (2013.01); *F05B 2280/6013* (2013.01); *Y02E 10/721* (2013.01); *Y10T 29/49336* (2015.01)

(58) Field of Classification Search
CPC . F03D 1/0675; F03D 1/0683; F05B 2240/30; F05B 2280/4005; F05B 2280/4003; F05B 2280/4007; B64C 3/185; B64C 11/20
USPC ........................................ 416/226, 230, 233
See application file for complete search history.

(56) References Cited

U.S. PATENT DOCUMENTS

| | | | | |
|---|---|---|---|---|
| 4,697,988 | A | 10/1987 | Kentfield et al. | |
| 7,891,950 | B2 * | 2/2011 | Baker et al. | 416/233 |
| 7,896,609 | B2 | 3/2011 | Mitchell et al. | |
| 8,171,633 | B2 * | 5/2012 | Zirin et al. | 29/889.61 |
| 8,178,987 | B2 | 5/2012 | Mahawili | |
| 2009/0068017 | A1 * | 3/2009 | Rudling | 416/219 R |
| 2010/0143143 | A1 * | 6/2010 | Judge | 416/226 |
| 2011/0084174 | A1 * | 4/2011 | Hemmelgarn et al. | 244/200 |
| 2011/0224846 | A1 | 9/2011 | Simon | |
| 2011/0293420 | A1 | 12/2011 | Hancock | |

(Continued)

FOREIGN PATENT DOCUMENTS

WO 2008070151 A2 6/2008

OTHER PUBLICATIONS

Lachenal et al.,"Review of Morphing Concepts and Materials for Wind Turbine Blade Applications", Wind Energy, 2012, 25 Pages.

*Primary Examiner* — Ninh H Nguyen
(74) *Attorney, Agent, or Firm* — Ann M. Agosti

(57) ABSTRACT

A wind blade with a self-supporting structural framework, having multiple chord-wise members and one or more span-wise members is provided. Each of the multiple chord-wise members and the one or more span-wise members have an aerodynamic contour. The wind blade also comprises a fabric skin located over the self-supporting structural framework in a tensioned state to generate an aerodynamic surface, wherein the fabric skin is attached via multiple tensioning members to both the chord wise members and span wise members.

18 Claims, 7 Drawing Sheets

28 50 74 72 64 70 66 60 68 70 62 72

28 80 80 72

(56) References Cited

U.S. PATENT DOCUMENTS

| | | | | |
|---|---|---|---|---|
| 2012/0027608 | A1 * | 2/2012 | Martinez | 416/223 R |
| 2012/0045332 | A1 | 2/2012 | Morris | |
| 2012/0068469 | A1 | 3/2012 | Behrens et al. | |
| 2012/0082555 | A1 | 4/2012 | Baker et al. | |

* cited by examiner

WIND TURBINE BLADES WITH TENSION FABRIC SKIN STRUCTURE

BACKGROUND

The present application relates generally to wind turbines and more particularly relates to wind turbine rotor blades having a tension fabric skin structure.

Most environment friendly energy sources presently available come from wind power that is considered to be one of the cleanest. In this regard, wind turbines have gained increased attention. Wind turbines generate electricity by effectively harnessing energy in the wind via a rotor having a set of rotor blades that turns a gearbox and generator, thereby converting mechanical energy to electrical energy that may be deployed to a utility grid. The construction of a modern rotor blade generally includes skin or shell components, span-wise extending spar caps, and one or more shear webs. Present technology uses several molds to fabricate the various pieces of the blade that are bonded together in large resin-infused molds. Such finished blades are relatively heavy and includes a hardened shell encasing the molded hardened shear webs or spar caps. This leads to difficulty in transportation and assembly of the wind turbines. Further, the size, shape, and weight of rotor blades are factors that contribute to energy efficiencies of wind turbines. An increase in rotor blade size increases the energy production of a wind turbine, while a decrease in weight furthers the efficiency of a wind turbine. Furthermore, as rotor blade sizes grow, extra attention needs to be given to the structural integrity of the rotor blades. Accordingly, efforts to increase rotor blade length, decrease rotor blade weight, and increase rotor blade strength, while also improving rotor blade aerodynamics, aid in the continuing growth of wind turbine technology and the adoption of wind energy as an alternative energy source.

There is therefore a desire for an improved rotor blade and method for assembling such a rotor blade for a wind turbine would be desired in the art. Such wind blades should improve overall system efficiency while being inexpensive to fabricate and providing a long lifetime.

BRIEF DESCRIPTION

In accordance with an embodiment of the invention, a wind blade is provided. The wind blade includes a self-supporting structural framework, having multiple chord-wise members and one or more span-wise members. Each of the multiple chord-wise members and the one or more span-wise members have an aerodynamic contour. The wind blade also comprises a fabric skin located over the self-supporting structural framework in a tensioned state to generate an aerodynamic surface, wherein the fabric skin is attached via multiple tensioning members to both the chord wise members and span wise members.

In accordance with an embodiment of the invention, a method of manufacturing a wind blade is provided. The method includes forming a self-supporting structural framework, having multiple chord-wise members and one or more span-wise members, wherein each of the plurality of the chord-wise members and the one or more span-wise members have an aerodynamic contour. The method also includes configuring a fabric skin having multiple fabric strips over the self-supporting structural framework in a tensioned state to generate an aerodynamic outer surface by attaching the fabric skin to both the chord wise members and the one or more span wise members.

In accordance with an embodiment of the invention, a wind turbine is provided. The wind turbine includes multiple wind blades, wherein each of the blades comprises a self-supporting structural framework, having multiple chord-wise members and one or more span-wise members. Each of the multiple chord-wise members and the one or more span-wise members have an aerodynamic contour. The wind turbine also includes a fabric skin located over the self-supporting structural framework in a tensioned state to generate an aerodynamic surface, wherein the fabric skin is attached via multiple tensioning members to both the chord wise members and span wise members.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments.

Figure 1:
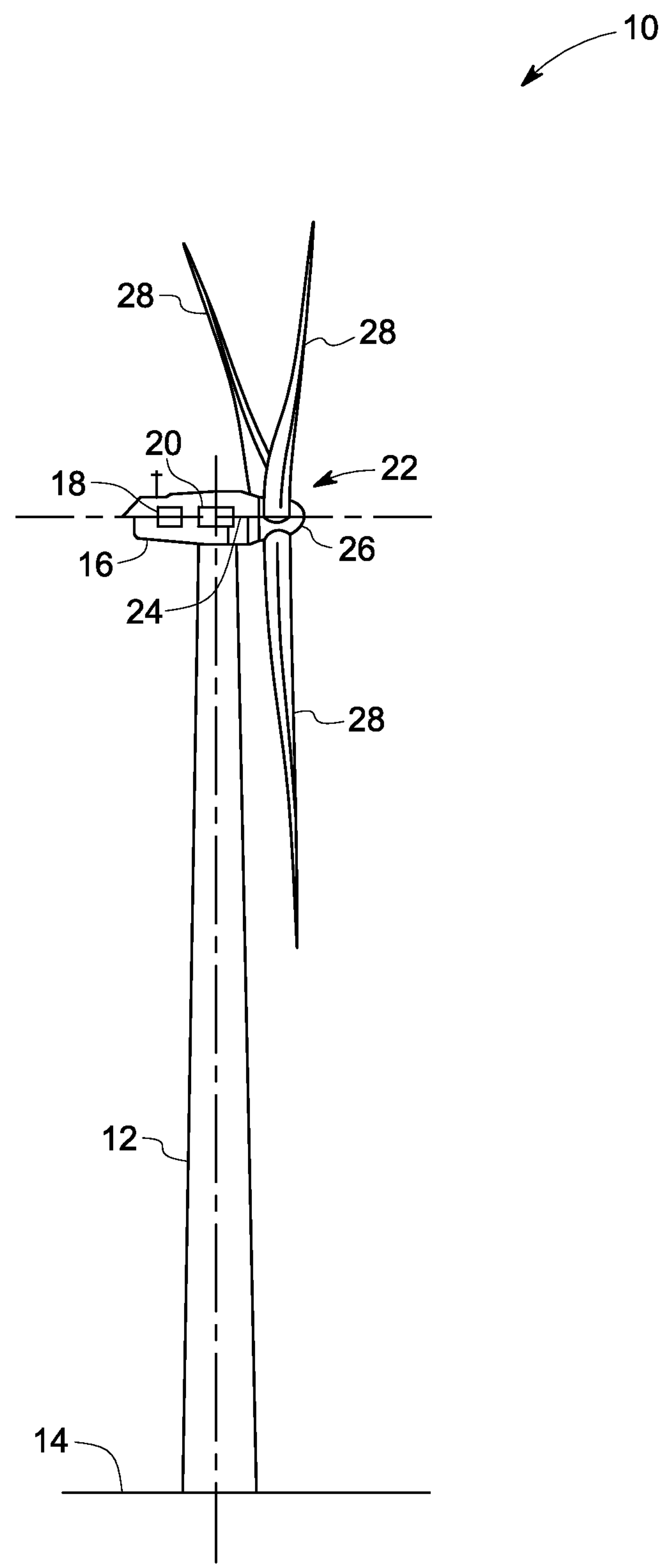
FIG. 1 is a side view of a wind turbine in accordance with an embodiment of the present invention.

FIG. 1 is a perspective view of an exemplary wind turbine 10 in accordance with an embodiment of the present invention. In this embodiment, the wind turbine 10 is a horizontal-axis wind turbine. Alternatively, the wind turbine 10 may be a vertical-axis wind turbine. In the present embodiment, the wind turbine 10 includes a tower 12 that extends from a support surface 14, a nacelle 16 mounted on the tower 12, a generator 18 positioned within the nacelle 16, a gearbox 20 coupled to the generator 18, and a rotor 22 that is rotatably coupled to the gearbox 20 with a rotor shaft 24. The rotor 22 includes a rotatable hub 26 and at least one rotor blade 28 coupled to and extending outward from the rotatable hub 26.

Figure 2:
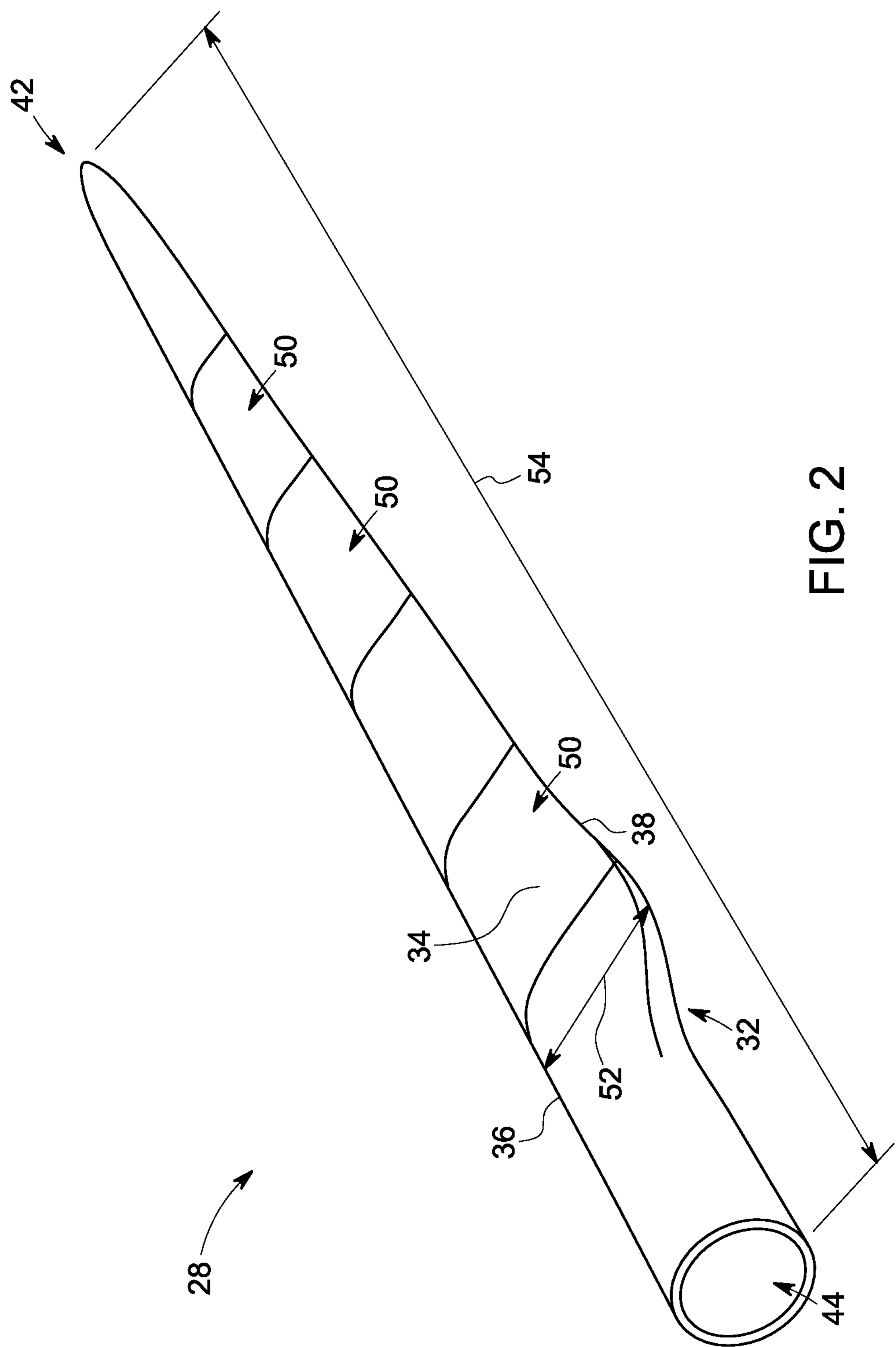
FIG. 2 is a perspective view of a rotor blade in accordance with an embodiment of the present invention.

FIG. 2 is a perspective view of a rotor blade 28 in accordance with an embodiment of the present invention. The rotor blade 28 includes a pressure side 32 and a suction side 34 extending between a leading edge 36 and a trailing edge 38, and may extend from a blade tip 42 to a blade root 44. The exterior surfaces may be generally aerodynamic surfaces having generally aerodynamic contours, as is generally known in the art. The rotor blade 28 further includes a fabric skin with multiple individual fabric sections 50 between the blade tip 42 and the blade root 44. Each of fabric sections 50 may be uniquely configured so that the multiple fabric sections 50 define a complete rotor blade 28 having a designed aerodynamic profile. For example, each of the fabric sections 50 may have an aerodynamic profile that corresponds to the aerodynamic profile of adjacent section 50. Thus, the aerodynamic profiles of the fabric sections 50 may form a continuous aerodynamic profile of the rotor blade 28. The rotor blade 28 may further define a chord 52 and a span 54 extending in chord-wise and span-wise directions, respectively. As shown, the chord 52 may vary throughout the span 54 of the rotor blade 28.

Figure 3:
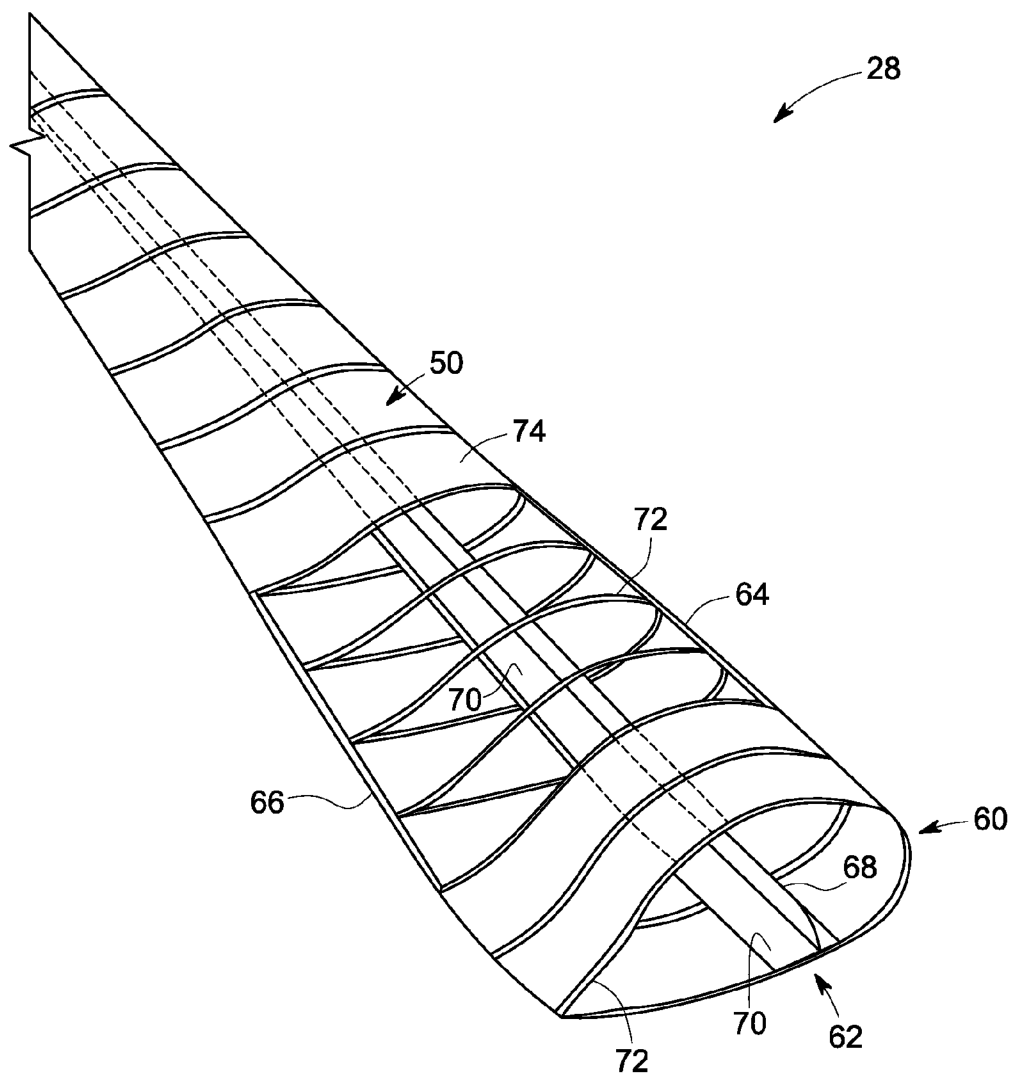
FIG. 3 is a perspective view of the rotor blade with chord-wise and span-wise members and tension fabric skin in accordance with an embodiment of the present invention.
Figure 4:
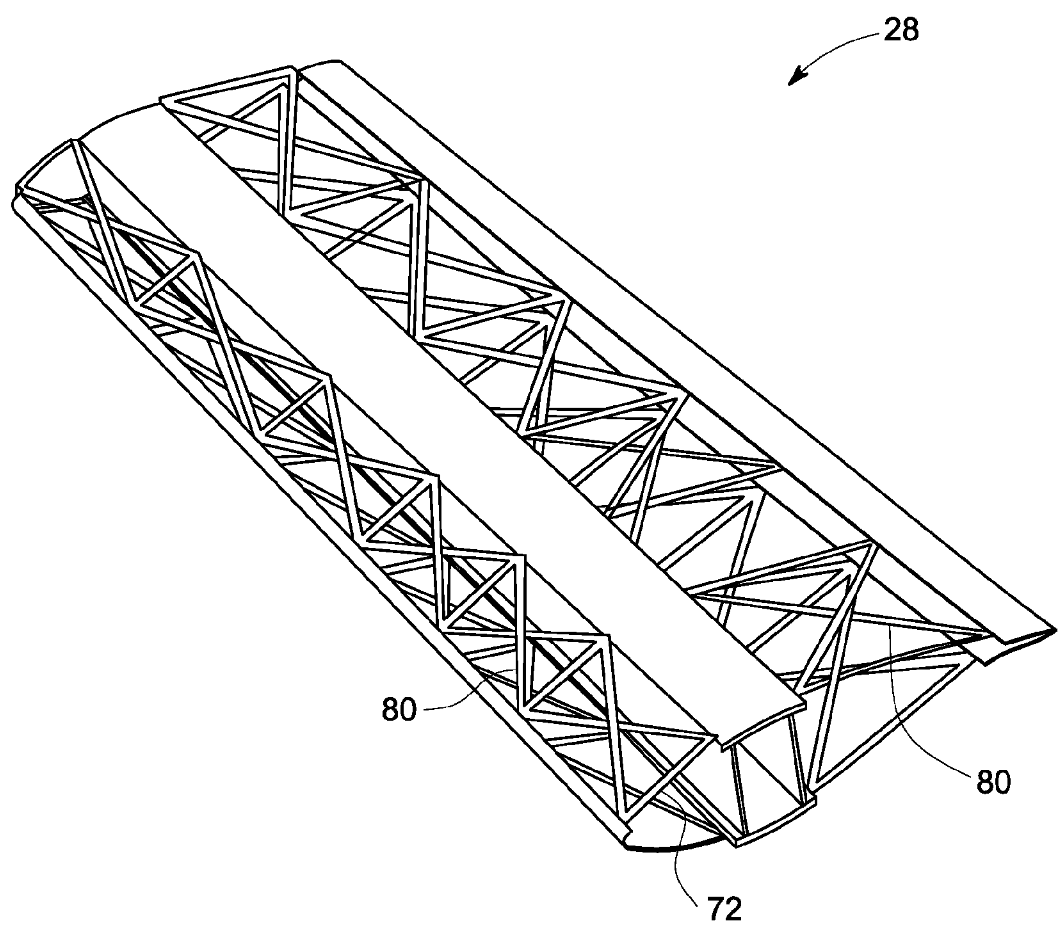
FIG. 4 shows a portion of the rotor blade having airfoil shaped reinforcing ribs connected via multiple truss elements in accordance with an embodiment of the present invention.

FIG. 3 illustrates further details of the rotor blade 28 in accordance with an embodiment of the present invention. The rotor blade 28 includes a self-supporting structural framework 60 that extents span-wise from the blade root 44 (shown in FIG. 2) towards the blade tip 42 (as shown in FIG. 2). The self-supporting structural framework 60 includes multiple chord-wise members and one or more span-wise members. Each of the multiple chord-wise members and the one or more span-wise members have an aerodynamic contour. As shown, the one or more span-wise members include an internal support structure 62, a leading edge reinforcement member 64 and a trailing edge reinforcement member 66. Further, the internal support structure 62 is formed from a single shear web 68 and associated spar caps 70 that run span-wise along the pressure side 32 and suction side 34 of the blade 28. This internal support structure 62 provides for rigidity and dimensional stability to the wind blade 28. In a non-limiting example, the internal support structure 62 includes a cross-section geometry with an I-beam shape or hat shape, C-shape, U-shape, T-shape, or combinations thereof. The multiple chord-wise members include multiple airfoil shaped reinforcing ribs 72 arranged in chord-wise orientation. The ribs 72 are attached to the leading edge reinforcement member 64 on one side, the trailing edge reinforcement member 66 on the other side and spaced along the internal support structure 62. In one embodiment, the multiple chord wise members include multiple airfoil shaped solid or hollow hoops. In one embodiment as shown in FIG. 4, the airfoil shaped reinforcing ribs 72 are connected via multiple truss elements 80 that provide additional strength to the overall self-supporting structural framework 60 of the wind blade 28.

Further, FIG. 3 shows the rotor blade 28 having the fabric skin with multiple individual fabric sections 50 located over the self-supporting structural framework in a tensioned state to generate an aerodynamic surface. The fabric skin is attached via multiple tensioning members to both the chord wise members and span wise members. The fabric skin also includes multiple fabric strips 74 attached to the multiple chord-wise members and/or the one or more span-wise members via the tensioning members. Non-limiting examples of materials of the tensioning members include extruded metal, roll formed metal and molded or pultruded polymer matrix composites. Further, each of the fabric strips 74 includes a fabric dimension smaller than a dimension of each of the chord-wise members and/or the one or more span-wise members such that the multiple fabric strips 74 are in tension when attached with the chord-wise members and/or the one or more span-wise members.

Furthermore, the fabric skin of the wind blade 28 includes reinforcing fibers and stretchable matrix materials. In one embodiment, the stretchable matrix material of the fabric skin has an elongation of greater than 10%. Non-limiting examples of the stretchable matrix materials include elastomers, PTFE, ETFE, PU, PVC, silicone, nitrile rubber, EPDM rubber, natural rubber, thermoplastic elastomers, thermoplastic vulcanizates, and combinations thereof. The natural rubber may be unsaturated rubbers and saturated rubbers, wherein non-limiting examples of the unsaturated rubbers comprises Natural polyisoprene: cis-1,4-polyisoprene natural rubber (NR) and trans-1,4-polyisoprene gutta-percha, Synthetic polyisoprene (IR for Isoprene Rubber), Polybutadiene (BR for Butadiene Rubber), Chloroprene rubber (CR), polychloroprene, Neoprene, Baypren; Butyl rubber (copolymer of isobutylene and isoprene, IIR), Halogenated butyl rubbers (chloro butyl rubber: CIIR; bromo butyl rubber: BIIR), Styrene-butadiene Rubber (copolymer of styrene and butadiene, SBR), Nitrile rubber (copolymer of butadiene and acrylonitrile, NBR), also called Buna N rubbers, Hydrogenated Nitrile Rubbers (HNBR) Therban and Zetpol. The unsaturated rubbers can be cured by sulfur vulcanization or non-sulfur vulcanization.

Non-limiting examples of saturated rubbers include EPM (ethylene propylene rubber, a copolymer of ethylene and propylene) and EPDM rubber (ethylene propylene diene rubber, a terpolymer of ethylene, propylene and a diene-component); Epichlorohydrin rubber (ECO), Polyacrylic rubber (ACM, ABR), Silicone rubber (SI, Q, VMQ), Fluorosilicone Rubber (FVMQ), Fluoroelastomers (FKM, and FEPM) Viton, Tecnoflon, Fluorel, Aflas and Dai-El, Perfluoroelastomers (FFKM) Tecnoflon PFR, Kalrez, Chemraz, Perlast, Polyether block amides (PEBA), Chlorosulfonated polyethylene (CSM), (Hypalon) and Ethylene-vinyl acetate (EVA). Advantageously, the fabric skin does not break under buckling conditions due the compliant nature of the stretchable matrix material.

The reinforcing fibers of the fabric skin may include a first layer of woven fabric material or non-crimp woven fabric material. Non-limiting examples of the reinforcing fibers comprises a glass-fiber, carbon fiber, Kevlar fiber, a natural fiber, a polymeric fiber and combinations thereof. Further, non-limiting examples of the natural fibers include flax, hemp, keneaf, bamboo, jute, banana, silk, sisal, pineapple, rime, and cotton. Furthermore, non-limiting examples of the polymeric fiber include Kevlar, polyester, ultem, propylene, and polyethylene.

The fabric skin of the wind blade 28 also includes one or more layers of coatings. The one or more layers of coatings include stretchable matrix materials. In one embodiment, the fabric skin of the wind blade 28 includes the one or more layer of coatings on either side of the first layer of woven fabric material or non-crimp woven fabric material. In another embodiment, the fabric skin of the wind blade 28 may include only one layer of coating. Further, the fabric skin thickness may be about 0.05 millimeters to about 5 millimeters.

Figure 5:
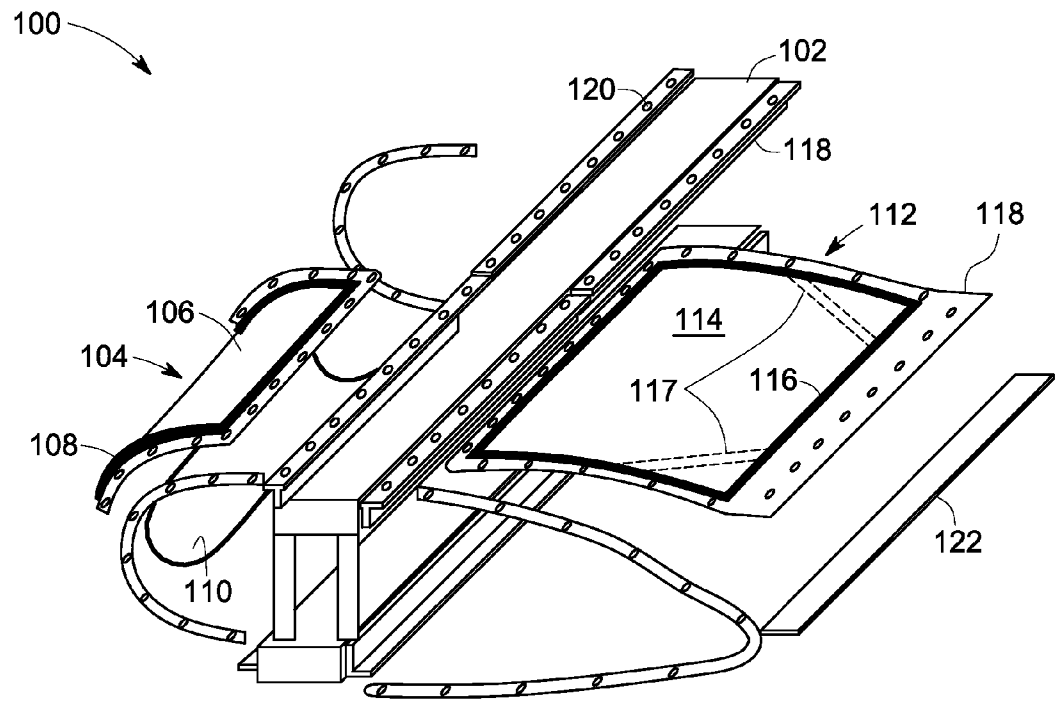
FIG. 5 shows an assembly of a wind blade that includes pre-fabricated sections in accordance with an embodiment of the present invention.

FIG. 5 shows an assembly of a wind blade 100 that includes pre-fabricated sections in accordance with an embodiment of the present invention. The wind blade 100 includes one or more pre-fabricated span-wise members 102. In one embodiment, the one or more pre-fabricated span-wise members 102 include a prefabricated spar cap with co-infused metal flange encapsulated with biax fabric. Further, the wind blade 100 includes multiple pre-fabricated leading edge sections 104 having a fabric skin 106 with a gasket 108 sewn into the edges of the fabric skin 106. The wind blade 100 also includes a leading edge form layer 110 adjacent to the fabric skin 106 for maintaining the shape of the leading edge of the pre-fabricated leading edge section 104. The wind blade 100 also includes one or more pre-fabricated trailing edge sections 112 having the fabric skin 114 with a gasket 116 sewn into the edges of the fabric skin 114. The fabric skin 114 is a precut tension fabric with a smaller geometry for setting the tension in the pre-fabricated trailing edge section 112. The pre-fabricated trailing edge section 112 further includes support braces 117 that help in transfer pressure loads evenly in the trailing edge sections of the wind blade 100. As shown, the wind blade 100 includes metal or plastic frames 118 with rivet holes 120 for mounting onto the self-supporting structure framework for simple on-tower replacement and local tension control. The wind blade 100 also includes a trailing edge reinforcement section 122 for providing rigidity to the trailing edge of the blade. In one embodiment, each of the multiple pre-fabricated leading edge sections 104 comprises a first precut tension fabric skin attached to a plurality of leading flexible strips at edges of the first precut tension fabric skin. In another embodiment, each of the multiple pre-fabricated trailing edge sections 118 comprises a second precut tension fabric skin attached to a plurality of trailing flexible strips at edges of the second precut tension fabric skin.

Figure 6:
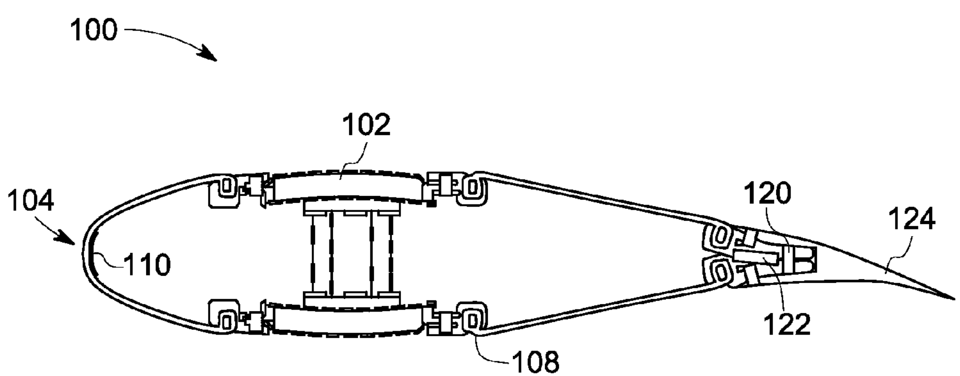
FIG. 6 shows a cross-section side view of the assembly of the wind blade in accordance with an embodiment of the present invention.

FIG. 6 shows a cross-section side view of the assembly of the wind blade 100. As shown, the wind blade 100 includes a prefabricated cast rubber trailing edge 124 assembled by riveting with the trailing edge reinforcement section 122 using the metal or plastic frames 118.

Figure 7:
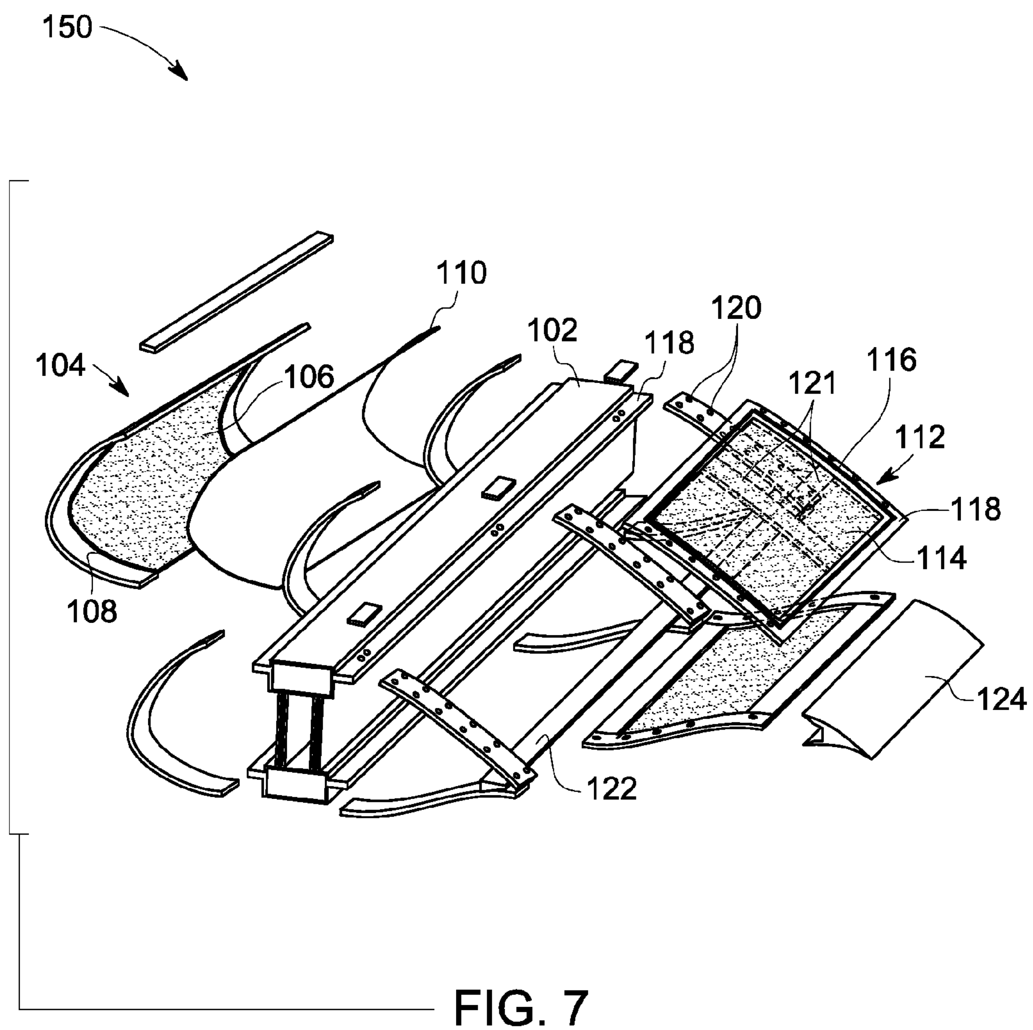
FIG. 7 shows an assembly of a wind blade that includes pre-fabricated sections in accordance with another embodiment of the present invention.

FIG. 7 shows an assembly of a wind blade 150 that includes pre-fabricated sections in accordance with another embodiment of the present invention. In this embodiment, the pre-fabricated trailing edge section 112 further includes support braces 121 that help in transfer pressure loads evenly in the trailing edge sections of the wind blade 100. The wind blade 150 includes the prefabricated cast rubber trailing edge 124 assembled by riveting with the trailing edge reinforcement section 122 using the metal or plastic frames 118. In one embodiment, each of the plurality of pre-fabricated leading edge sections 104 comprises a first precut tension fabric skin attached to a rigid frame at the edges of the first precut tension fabric skin. In another embodiment, each of the plurality of pre-fabricated trailing edge sections 112 comprises a second precut tension fabric skin attached to a rigid frame at the edges of the second precut tension fabric skin.

Figure 8:
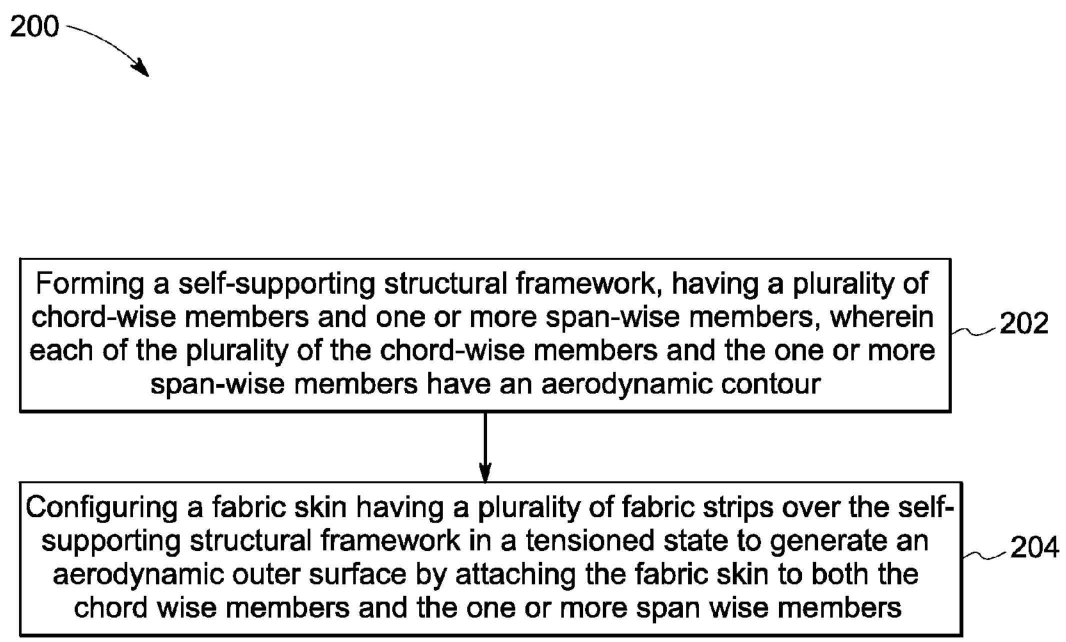
FIG. 8 is flow chart of a method of manufacturing a wind blade in accordance with an embodiment of the present invention.

FIG. 8 is flow chart 200 of a method of manufacturing a wind blade in accordance with an embodiment of the present invention. At step 202, the method includes forming a self-supporting structural framework, having multiple chord-wise members and one or more span-wise members, wherein each of the plurality of the chord-wise members and the one or more span-wise members have an aerodynamic contour. The method includes integrating the chord-wise members and the one or more span-wise members, the plurality of pre-fabricated trailing edge and leading edge sections at root section of the wind blade. The method also includes forming the self-supporting structural framework by interconnecting opposing spar caps with a shear web structure, wherein the plurality of ribs are connected with spar caps. Further, at step 204, the method also includes configuring a fabric skin having multiple fabric strips over the self-supporting structural framework in a tensioned state to generate an aerodynamic outer surface by attaching the fabric skin to both the chord wise members and the one or more span wise members. In one embodiment, the method includes assembling a plurality of pre-fabricated trailing edge and leading edge sections, wherein each of the sections comprise a precut tension fabric skin attached to a plurality of leading flexible strips and a plurality of trailing flexible strips at edges of the precut tension fabric skin. In a second embodiment, the method includes assembling a plurality of pre-fabricated trailing edge and leading edge sections, wherein each of the sections comprise a precut tension fabric skin attached to a rigid frame at the edges of the precut tension fabric skin.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A wind blade comprising:

a self-supporting structural framework of the wind blade comprising a plurality of chord-wise members comprising airfoil shaped reinforcing ribs having aerodynamic contours and one or more span-wise members comprising one or more wind blade spar caps having aerodyanmic contours; and a fabric skin located over the self-supporting structural framework in a tensioned state to generate an aerodynamic surface, wherein the fabric skin is attached to both the chord wise members and span wise members, wherein the fabric skin comprises stretchable matrix materials and reinforcing fibers comprising a first layer of woven fabric material or non-crimp woven fabric.

2. The wind blade of claim 1, wherein the stretchable matrix material has an elongation of greater than 10%.

3. The wind blade of claim 1, wherein the stretchable matrix material is selected from the group consisting of elastomers, PTFE, ETFE, PU, PVC, silicone, nitrile rubber, EPDM rubber, natural rubber, thermoplastic elastomers, thermoplastic vulcanizates, and combinations thereof.

4. The wind blade of claim 1, wherein the reinforcing fibers is selected from the group consisting of a glass-fiber, carbon fiber, Kevlar fiber, a natural fiber, a polymeric fiber and combinations thereof.

5. The wind blade of claim 1, wherein the fabric skin comprises one or more layers of coatings on either side of the first layer of woven fabric material or non-crimp woven fabric, wherein the one or more layers of coatings include stretchable matrix materials.

6. The wind blade of claim 1, wherein a thickness of the fabric skin is about 0.05 millimeters to about 5 millimeters.

7. The wind blade of claim 1, wherein the fabric skin does not break under buckling conditions.

8. The wind blade of claim 1, wherein the plurality of pre-fabricated sections of precut tension fabric skin comprise a plurality of pre-fabricated leading edge sections, wherein each of the plurality of pre-fabricated leading edge sections comprises a first precut tension fabric skin attached to a respective frame at the edges of the first precut tension fabric skin.

9. The wind blade of claim 1, wherein the plurality of pre-fabricated sections of precut tension fabric skin comprise a plurality of pre-fabricated trailing edge sections, wherein each of the plurality of pre-fabricated trailing edge sections comprises a second precut tension fabric skin attached to a rigid respective frame at the edges of the second precut tension fabric skin.

10. A wind blade comprising:

a self-supporting structural framework of the wind blade comprising a plurality of chord-wise members comprising airfoil shaped reinforcing ribs having aerodynamic contours and one or more span-wise members comprising one or more wind blade spar caps having aerodyanmic contours; and a fabric skin located over the self-supporting structural framework in a tensioned state to generate an aerodynamic surface, wherein the fabric skin is attached to both the chord wise members and span wise members wherein the fabric skin comprises a plurality of fabric strips attached to the plurality of chord-wise members and the one or more span-wise members.

11. The wind blade of claim 10, wherein each of the fabric strips comprises a fabric dimension smaller than a dimension between each of the chord-wise members and the one or more span-wise members that the respective fabric strip is attached to such that the plurality of fabric strips are in tension when attached with the chord-wise members and/or the one or more span-wise members.

12. The wind blade of claim 10, wherein each of the reinforcing ribs are attached to the one or more span-wise members, which one or more span-wise members includes an internal support structure with a cross-section geometry of an I-beam shape or hat shape, C-shape, U-shape, T-shape, solid or hollow rectangular bar, or combinations thereof.

13. The wind blade of claim 10, wherein the plurality of airfoil shaped reinforcing ribs are connected via a plurality of truss elements.

14. The wind blade of claim 10, wherein the plurality of the chord wise members comprises a plurality of airfoil shaped solid or hollow hoops.

15. A wind blade comprising:

a self-supporting structural framework of the wind blade comprising a plurality of chord-wise members comprising airfoil shaped reinforcing ribs having aerodynamic contours and one or more span-wise members comprising one or more wind blade spar caps having aerodyanmic contours; and a fabric skin located over the self-supporting structural framework in a tensioned state to generate an aerodynamic surface, wherein the fabric skin is attached to both the chord wise members and span wise members, wherein the fabric skin comprises a plurality of pre-fabricated sections of precut tension fabric skin and frames comprising a material selected from a group of extruded metal, roll formed metal, and molded or pultruded polymer matrix composites.

16. A method of manufacturing a wind blade, the method comprising:

forming a self-supporting structural framework, having a plurality of chord-wise members and one or more span-wise members, wherein each of the plurality of the chord-wise members and the one or more span-wise members have an aerodynamic contour; and configuring a fabric skin having a plurality of fabric strips over the self-supporting structural framework in a tensioned state to generate an aerodynamic outer surface by attaching the fabric skin to both the chord wise members and the one or more span wise members;

wherein configuring the fabric skin comprises assembling a plurality of pre-fabricated trailing edge and leading edge sections, wherein each of the sections comprise a precut tension fabric skin, and attaching the pre-fabricated trailing edge and leading edge sections to the chord wise and the one or more span wise members.

17. The method of claim 16, further comprising integrating the chord-wise members and the one or more span-wise members, the plurality of pre-fabricated trailing edge and leading edge sections at root section of the wind blade.

18. The method of claim 16, further comprising forming the self-supporting structural framework by interconnecting opposing spar caps with a shear web structure, wherein the plurality of ribs are connected with spar caps.

* * * * *

UNITED STATES PATENT AND TRADEMARK OFFICE

CERTIFICATE OF CORRECTION

PATENT NO. : 9,188,102 B2
APPLICATION NO. : 13/665148
DATED : November 17, 2015
INVENTOR(S) : Krishnamurthy et al.

It is certified that error appears in the above-identified patent and that said Letters Patent is hereby corrected as shown below:

In the Specification

In Column 4, Line 44, delete “keneaf,” and insert -- kenleaf, --, therefor.

In Column 5, Line 21, delete “edge sections 118” and insert -- edge sections 112 --, therefor.

In the Claims

In Column 6, Lines 35-36, in Claim 1, delete “aerodyanmic” and insert -- aerodynamic --, therefor.

In Column 7, Line 9, in Claim 9, delete “rigid respective” and insert -- respective --, therefor.

In Column 7, Lines 16-17, in Claim 10, delete “aerodyanmic” and insert -- aerodynamic --, therefor.

In Column 8, Lines 6-7, in Claim 15, delete “aerodyanmic” and insert -- aerodynamic --, therefor.

Signed and Sealed this
Sixteenth Day of February, 2016

Michelle K. Lee
*Director of the United States Patent and Trademark Office*